& nbsp;

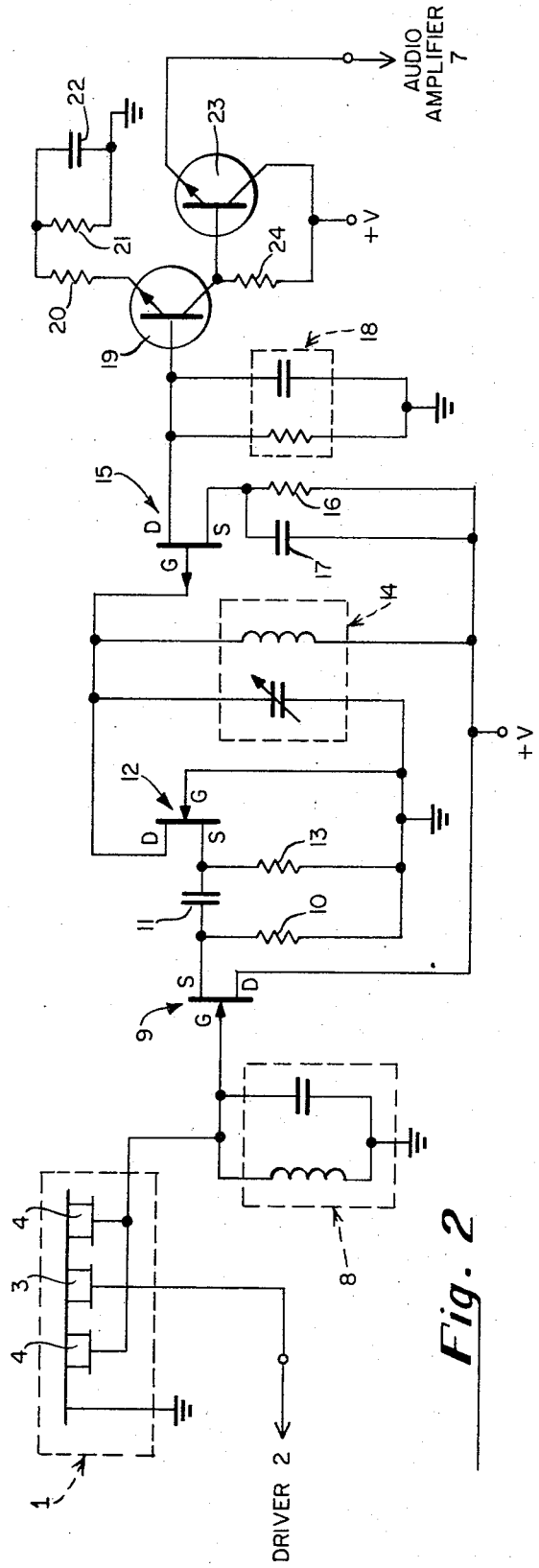
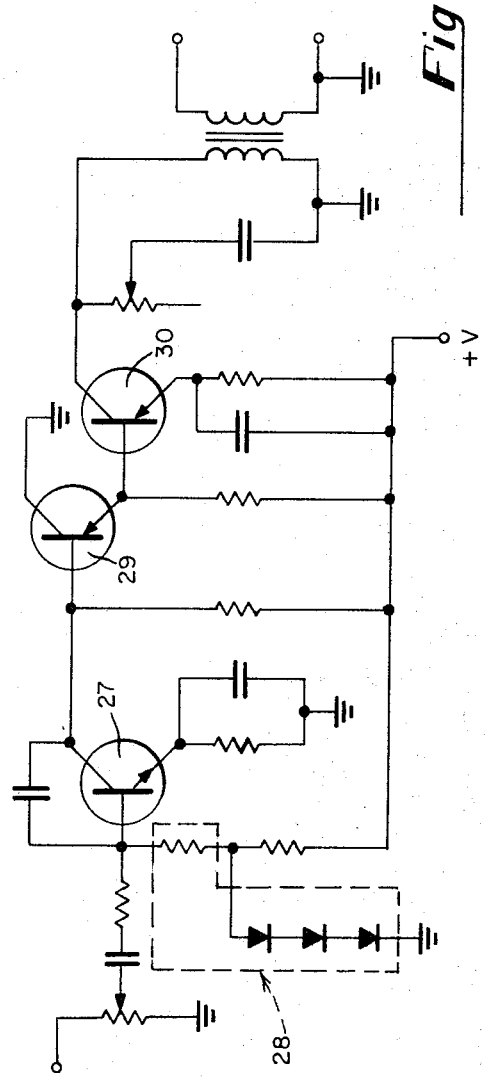
Fig. 2
Fig. 3
INVENTOR.
Martin H. Wilcox
Paul H. Egli
BY Paul & Paul
ATTORNEYS.

United States Patent Office 3,525,976
Patented Aug. 25, 1970

3,525,976
ULTRASONIC AMPLITUDE-DOPPLER DETECTOR
Martin H. Wilcox, Media, Pa., and Paul H. Egli, Collingswood, N.J., assignors to Parke, Davis & Company, Detroit, Mich., a corporation of Michigan
Filed Dec. 27, 1968, Ser. No. 787,397
Int. Cl. G01s 9/66
U.S. Cl. 340—1   9 Claims

ABSTRACT OF THE DISCLOSURE

Apparatus suitable for detection of movement is disclosed wherein a transducer transmits ultrasonic energy and receives ultrasonic reflections encoded with both Doppler and amplitude information, said transducer receiver generating a low level electrical signal which is passed through several stages of amplification and detected solely by amplitude modulation direction means, and amplified at audio frequencies.

BRIEF SUMMARY OF THE INVENTION

This invention relates to a system and apparatus for transmitting and receiving low power ultrasonic signals and detecting information produced both by amplitude modulation of and Doppler frequency shifts in the transmitted signal.

BACKGROUND OF THE INVENTION

Field of the invention

This invention lies in the field of ultrasonic detection of moving objects and fluid flow by Doppler and amplitude modulation techniques.

Description of the prior art

There has long been a basic need for an ultrasonic, Doppler-shift diagnostic device for use in medical and other fields. The basic technique of directing a narrow beam of ultrasound at a high frequency into an interior area such as the abdomen and receiving, amplifying and detecting the Doppler-shifted components of the ultrasound beam reflected from a target such as a beating fetal heart has been shown to be highly successful clinically in early diagnosis of pregnancy, fetal viability, and other related matters. Basic early techniques in this art comprised the use of quartz ultrasonic transducers and vacuum tube drivers and receiving circuitry. Such devices met with little commercial success, primarily because of high cost, low sensitivity, and lack of portability. Subsequent developments utilized piezoelectric ceramic devices for their ultrasonic transducers and introduced solid state drivers and receivers. Such systems remain limited by the characteristics of the transducers employed, and by receiver design based on early transistor art. The best commercially available Doppler-shift diagnostic tools suffer from a basic lack of sensitivity and from high power consumption.

The device or system of the present invention is different in significant respects and is to be distinguished from prior art devices and systems of which we are aware. The subject device utilizes a bull's-eye-shaped transducer which has superior directional and sensitivity properties. It has no particular focal point, and has been found to be useful in both the near-field and far-field regions. The transducer develops less than one milliwatt/$cm.^2$, in contradistinction to present art devices which operate at from 50 milliwatts/$cm.^2$ to 6 watts/$cm.^2$. The reduced incident power enables safe use of this device in clinical applications where large incident power would be destructive of body tissue. The unique receiver circuit amplifies the incoming signal which is in the order of a microvolt or less, and detects both Doppler shift information and amplitude modulation information solely with amplitude modulation detection means.

SUMMARY OF THE INVENTION

This invention relates to a new and novel system and apparatus for detection of moving objects and fluid flow by transmitting ultrasonic energy at a low energy level and detecting Doppler frequency-shift and amplitude modulation information content in the received signal. The invention is particularly adapted for clinical applications in medical areas, detection of fluid flow, and detection of movement of hidden targets. In the preferred embodiment of our invention, the transducer is a bullseye-shaped transducer of the form described in co-pending application for U.S. Letters Patent titled Ultrasonic Beam Transducer. The incoming signal which has been reflected from the target object will, in the general case, contain amplitude modulation due to changing size and/or reflectivity of the object, as well as Doppler frequency-shift information, due to the movement of the target. The total signal is received linearly by the transducer which transforms it into an electrical signal which is fed into the receiver circuit. Said signal is filtered by a band-pass filter in order to discriminate against noise, and fed through two stages of amplification by field effect transistors, which are impedance-matched for optimum gain. The signal, still containing both frequency shift and amplitude modulation information, is coupled into a field-effect transistor with an RC-integrator output, which combination both amplifies and detects the information carried on the envelope of the signal. Since the frequency modulation component is manifested as a low frequency change in the envelope, and is added linearly to the amplitude modulation component, envelope detection yields the sum of the two signal components. The detected signal is then coupled into a voltage regulated audio amplifier where the signal is amplified to the desired output level.

An object of our invention is a diagnostic tool for medical applications such as the detection of fetal heartbeat, diagnosis of pregnancy, and rate of blood flow.

Another object of our invention is the detection of liquid flow through industrial systems.

A further object of our invention is the detection of moving objects, such as the detection of marine life in water.

Another object of our invention is the detection of internal vibrations in machines or instruments.

DESCRIPTION OF THE DRAWINGS

FIG. 2 is a schematic diagram of the receiver circuitry of the invention.

FIG. 3 shows a preferred embodiment of the audio amplifier used in the invention.

DETAILED DESCRIPTION OF THE DRAWINGS

Figure 1:
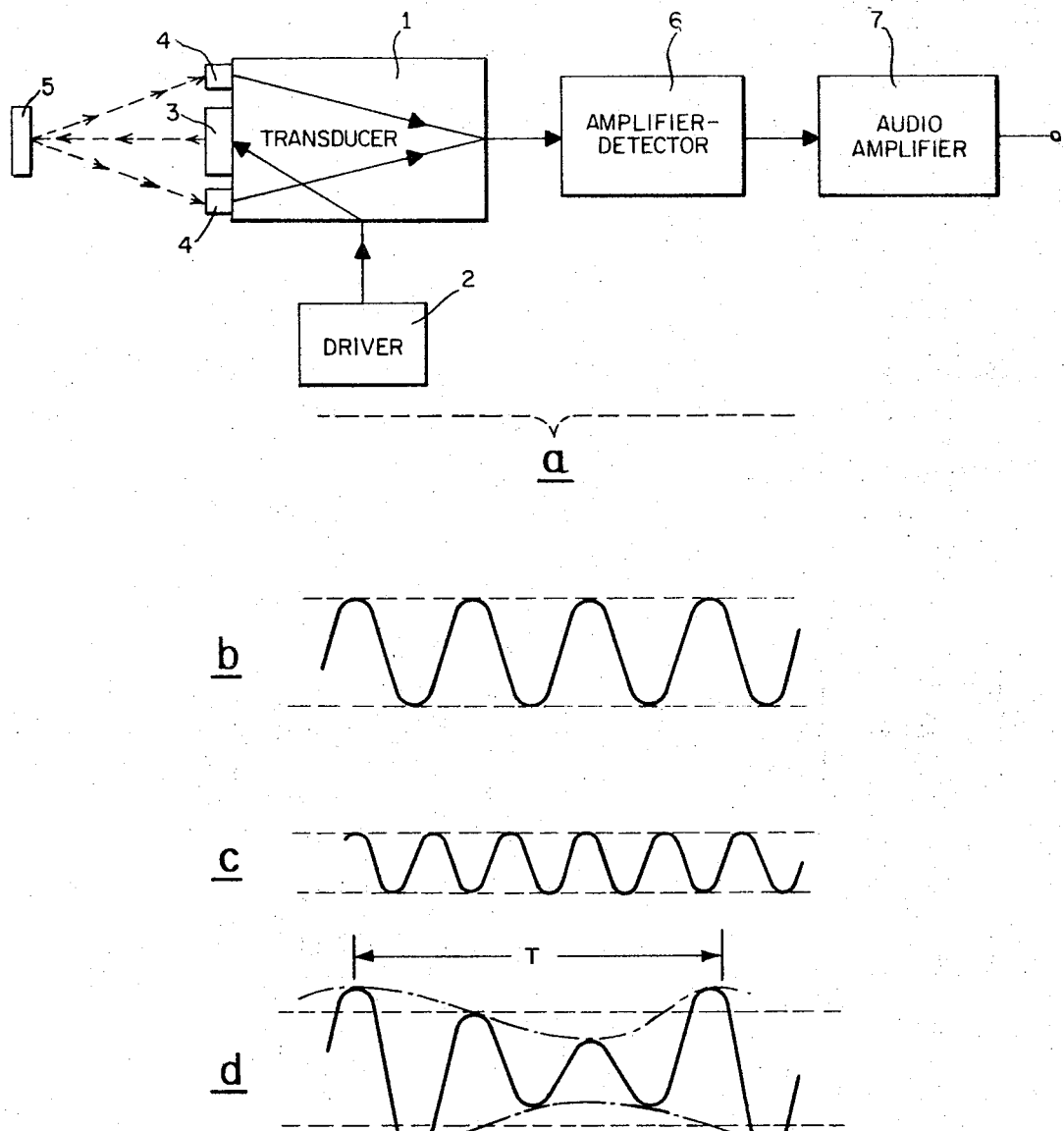
FIG. 1a is a block diagram of the primary components of the invention, with a flow diagram indicating the flow of signal information through the system. FIGS. b, c, and d illustrate the generation of amplitude modulation when two signals of different frequencies are added linearly.

In FIG. 1, transducer 1 is a bull's-eye-shaped transducer driven by an electronic driver 2. The driver is a solid state oscillator of conventional design, driving the transducer at a crystal controlled frequency. The driver signal drives the center part 3 of the transducer which radiates a narrow beam of low intensity ultrasonic energy. The energy is directed toward a target 5 which may be a moving solid object or which may represent fluid flow through a vessel. The reflected signal is received by the annular outside ring 4 of the transducer, and is converted into an electrical signal which is coupled into the amplifier-detector 6. The detected signal is coupled into the audio amplifier 7 for amplification to a useful level.

The system as described in block diagram form in FIG. 1a is designed to receive reflected signals which are altered in both frequency and amplitude by the movement of target 5. If the target moves in such a manner as to cause solely a change in reflected signal strength, simple amplitude modulation results. By contrast, the target movement may be such as to produce changes in the phase or frequency of the return signal, this being the well-known Doppler phenomenon. It is a feature of this invention that such frequency-modulated information can be detected by normal amplitude modulation circuitry. To illustrate this, FIGS. 1b, c, and d show representative waveforms.

FIG. 1b depicts an unmodulated sine wave such as would be transmitted by the transducer. Part of this signal will be received in unaltered form, either as a reflection from the stationary background, or due to direct coupling from the transmitter section of the transducer. FIG. 1c depicts a return signal at a different frequency, such difference in frequency being due to the Doppler effect of the moving target. Such two signals at differing frequencies will be added when received in the transducer, it being a property of said transducer that it adds linearly the component signals received. FIG. 1d depicts the linear addition of the two received signals, which addition shows the effective amplitude modulation which is manifested by a low frequency amplitude envelope. The period of the envelope, designated T in FIG. 1d, is limited to the difference in frequency between the two signals which have been added, T being the inverse of such difference in frequency. FIG. 1d, then, is a representation of the form of amplitude modulation which the system will detect in the presence of a Doppler frequency-shift return signal.

In FIG. 2, the receiving part 4 of transducer 1 delivers an electrical signal, the information of which is centered about the transmitting frequency which, in the preferred embodiment, is five megacycles. The signal is filtered by the high Q tuned circuit 8 which acts as a narrow bandpass filter discriminating against noise from outside of the bandpass range of frequencies. The signal developed across tuned circuit 8 is coupled directly into the gate of field effect transistor 9 which has a high input impedance which matches the impedance of tuned circuit 8. The output across resistor 10, which biases field effect transistor 9, is coupled through capacitor 11 to the source of field effect transistor 12 which is self-biased through resistor 13. The source-coupling between these two stages provides high isolation and eliminates the need for neutralization. The output from field effect transistor 12 is derived at the drain connection, to which is attached a tuned circuit 14 having the same bandpass properties as tuned circuit 8. The signal developed across tuned circuit 14 is coupled directly into the gate of field effect transistor 15, which acts as a detector amplifier and, in combination with integrator 18, detects the low frequency amplitude modulation, or envelope, carried on the five megacycle signal. Field effect transistor 15 is self-biased through resistor 16 which is bypassed by capacitor 17.

The output signal developed at the drain of field effect transistor 15 is coupled directly into two stages of audio pre-amplification. The design utilizes the constant current output characteristics of the field effect transistor, which constant current characteristic is manifested by the property that the quiescent, or no-signal drain current of field effect transistor 15 is very constant with variations in power supply voltage. Consequently, the DC base current of transistor 19 is held constant, in turn holding the collector current of transistor 19 constant, causing a constant voltage drop across resistor 24 which stabilizes the DC conditions in transistor 23. The low frequency signal detected by field effect transistor 15 and integrator 18 is amplified by transistor 19, the gain of which is controlled by resistors 20 and 21 in series, resistor 21 being bypassed by capacitor 22. Transistor 23, in common emitter configuration, provides further current gain and a low output impedance suitable for coupling to a transmission line. The output from the emitter of transistor 23 is, in the preferred embodiment, coupled through a short transmission line to the audio amplifier 7.

The characteristics of the receiver circuit shown in FIG. 2 can be further understood by tracing an information-bearing signal through the receiver. Assume that the signal shown in FIG. 1d is received by transducer 1. Such signal contains energy of two discrete frequencies, i.e., the transmission frequency of five megacycles, and a frequency different from the transmission frequency by the amount of the Doppler shift caused by movement of the target. Assume that the Doppler shift is two hundred cycles, such that the returning energy is found at a frequency of five megacycles plus two hundred cycles per second. In passing through tuned circuit 8, any spurious signals or noise outside of the narrow band of the tuned circuit would be eliminated. The signal, in being amplified through field effect transistors 9 and 12, maintains the same envelope as shown in FIG. 1d, the entire signal being linearly amplified. Such signal, composed of the high frequency components and with a changing amplitude as reflected by the envelope having a 200 cycle frequency, is coupled into field effect transistor 15 and integrator 18, the combination serving to eliminate the high frequencies and to yield only the 200 cycle low frequency component which represents the movement of the target. Similarly, if the target produces solely amplitude modulation, due to its changing target size or changing reflectivity, the incoming signal will have an amplitude envelope similar in nature to that shown in FIG. 1d. Such amplitude modulation component will be amplified and detected in the same manner. Since the transducer and amplifier stages operate linearly, the amplitude envelope of the amplified signal prior to detection would be the linear addition of envelope changes caused by the Doppler frequency changes and amplitude modulation changes respectively. The detected signal then, will contain information components reflecting both Doppler shift and amplitude modulation.

FIG. 3 shows a preferred embodiment of the audio amplifier. The first amplifier stage, comprised of transistor 27, is voltage regulated by resistor diode combination 28. The three diodes in series achieve a regulated voltage of 1.7 volts which is substantially constant over a battery voltage range of 10 to 18 volts. This 1.7 volts supply provides a stabilized bias to transistor 27 which in turn is direct coupled to transistors 29 and 30. The stabilized collector current in transistor 27 will stabilize the operating condition of transistor 29, which in turn, being direct coupled to transistor 30, stabilizes the quiescent condition of transistor 30. Thus, regulator 28 and the technique of DC coupling of the three transistor stages achieves a highly stabilized DC coupled amplifier.

In accordance with the above, this invention is capable of detecting both Doppler frequency and amplitude modulation information. Insomuch as both components carry information, both are detected. The invention, which radiates an amount of incident power of an order of magnitude less than existing devices in the art, provides a high signal output with no appreciable noise.

Although this invention has been described with reference to specific forms thereof, it would be appreciated that other variations may be made without departing from the spirit and scope of the invention. Means can be introduced at the input of the receiver to clip, or limit the signal such that it is suitable for detection of the FM component alone. After limiting, the signal could be coupled to a parallel set of amplifier stages, and in turn passed through a frequency modulation discriminator. Similarly, the driver 2 could be pulse-modulated so that the transducer would transmit pulses of five megacycle sound energy. In such an embodiment, after amplification through field effect transistors 9 and 12, the signal would be coupled to pulse position detection means as well as modulation detection means.

What is claimed is:

1. Apparatus for detection of moving targets, comprising:
    (a) a transducer;
    (b) linear amplifier means coupled to and driven by said transducer having two cascaded field effect transistors each having a gate, drain, and source, the input to the first of said field effect transistors being into the gate thereof, and the output of said first field effect transistor being developed at the source thereof, said source of said first field effect transistor being capacitively coupled into the source of said second field effect transistor, said second field effect transistor being in a common gate configuration and having its drain as its output;
    (c) detector means driven by said linear amplifier means; and,
    (d) said linear amplifier means and said detector means cooperating to generate an electrical output containing amplitude modulation and frequency modulation components.

2. Apparatus as claimed in claim 1 wherein said amplitude detector means is comprised of a third field effect transistor having a drain terminal, and a resistor-capacitor integrator coupled to said drain terminal, said amplitude detector means having a low frequency bandpass sufficient to detect Doppler-shift frequencies as well as amplitude modulation frequencies.

3. Apparatus as claimed in claim 1 wherein said transducer is bullseye-shaped and transmits less than one milliwatt/cm.$^2$ of incident power.

4. An apparatus for detection of a moving target, said apparatus comprising:
    (a) a transducer having a transmitter component, and a receiving component for receiving reflected energy at frequencies equal to and displaced from the transmitted frequency by an amount within the audio range of frequencies and for converting such received energy into an electrical signal;
    (b) driver means, coupled to and supplying electrical power to the transmitter component of said transducer;
    (c) first bandpass filter means coupled to the receiver component of said transducer;
    (d) first amplifier means coupled to said bandpass filter and driven by the signal developed across said bandpass filter;
    (e) second bandpass filter means coupled to the output of and driven by said first amplifier means;
    (f) amplitude detector means coupled to said second bandpass filter means and driven by the signal developed thereacross, having a field effect transistor with a drain terminal, and a resistor-capacitor integrator coupled to said drain terminal, having a low frequency bandpass sufficient to detect Doppler-shift frequencies as well as amplitude modulation frequencies;
    (g) audio pre-amplification means coupled to said amplitude detector means and driven by the signal developed thereby, and possessing stabilized current characteristics and low output impedance characteristics;
    (h) audio amplifier means driven by and coupled to the output of said audio pre-amplification means; and,
    (i) said first bandpass filter means, first amplifier means, second bandpass filter means, and amplitude detector means cooperating to preserve and detect both Doppler shift information and amplitude modulation information contained in said electrical signal.

5. Apparatus for detection of a moving target, said apparatus comprising:
    (a) a transducer having a transmitter component, and a receiving component for receiving reflected energy at frequencies equal to and displaced from the transmitted frequency by an amount within the audio range of frequencies and for converting such received energy into an electrical signal;
    (b) driver means, coupled to and supplying electrical power to the transmitter component of said transducer;
    (c) first bandpass filter means coupled to the receiver component of said transducer;
    (d) first amplifier means coupled to said bandpass filter and driven by the signal developed across said bandpass filter;
    (e) second bandpass filter means coupled to the output of and driven by said first amplifier means;
    (f) amplitude detector means coupled to said second filter means and driven by the signal developed across said second filter means;
    (g) audio pre-amplification means coupled to said amplitude detector means and driven by the signal developed thereby, and possessing stabilized current characteristics and low output impedance characteristics;
    (h) audio amplifier means driven by and coupled to the output of said audio pre-amplification means;
    (i) said first bandpass filter means, first amplifier means, second bandpass filter means, and amplitude detector means cooperating to preserve and detect both Doppler shift information and amplitude modulation information contained in said electrical signal; and
    (j) said first amplifier means comprising two cascaded field effect transistors, each having a gate, source and drain, the input to the first of said field effect transistors being into the gate thereof, and the output of said first field effect transistor being at the source thereof, said source being capacitively coupled into the source of the second of said field effect transistors, said second field effect transistor being in a common gate configuration and having the drain thereof as an output terminal, for amplifying electrical signals representing said moving target.

6. Apparatus as claimed in claim 5 wherein said amplitude detector means is comprised of a third field effect transistor having a drain terminal, and a resistor-capacitor integrator coupled to said drain terminal, said amplitude detector means having a low frequency bandpass sufficient to detect Doppler-shift frequencies as well as amplitude modulation frequencies contained in said electrical signal.

7. Apparatus as claimed in claim 6 wherein said audio pre-amplification means is comprised of two direct-coupled transistors, the first of said two transistors being direct coupled to said drain of said third field effect transistor, the second of said transistors being arranged in common emitter configuration having a low output impedance characteristic.

8. Apparatus for detection of a moving target, said apparatus comprising:
    (a) a transducer having a transmitter component, and a receiving component for receiving reflected energy at frequencies equal to and displaced from the transmitted frequency by an amount within the audio range of frequencies and for converting such received energy into an electrical signal;
    (b) driver means, coupled to and supplying electrical power to the transmitter component of said transducer;
    (c) first bandpass filter means coupled to the receiver component of said transducer;

(d) first amplifier means coupled to said bandpass filter and driven by the signal developed across said bandpass filter;
(e) second bandpass filter means coupled to the output of and driven by said first amplifier means;
(f) amplitude detector means coupled to said second filter means and driven by the signal developed across said second filter means;
(g) audio pre-amplification means coupled to said amplitude detector means and driven by the signal developed thereby, and possessing stabilized current characteristics and low output impedance characteristics;
(h) audio amplifier means driven by and coupled to the output of said audio pre-amplification means;
(i) said first bandpass filter means, first amplifier means, second bandpass filter means, and amplitude detector means cooperating to preserve and detect both Doppler-shift information and amplitude modulation information contained in said electrical signal; and
(j) said amplitude detector means being comprised of a third field effect transistor having a drain terminal, and a resistor-capacitor integrator coupled to said drain terminal, said detector means having a low frequency bandpass sufficient to detect Doppler-shift frequencies as well as amplitude modulation frequencies.

9. Apparatus as claimed in claim 8 wherein said audio pre-amplification means is comprised of two direct-coupled transistors, the first of said two transistors being direct coupled to said drain of said third field effect transistor, the second of said transistors being arranged in common emitter configuration having a low output impedance characteristic.

References Cited

UNITED STATES PATENTS

| | | | |
|---|---|---|---|
| 2,961,869 | 11/1960 | Bagno. | |
| 3,057,188 | 10/1962 | Henry | 73—67.1 |
| 3,123,798 | 3/1964 | Holloway et al. | 340—3 |
| 3,125,693 | 3/1964 | DeClue | 330—20 X |
| 3,222,610 | 12/1965 | Evans et al. | 330—17 X |
| 3,262,062 | 7/1966 | Langan | 307—297 X |
| 3,327,286 | 6/1967 | Dorr et al. | 340—8 |
| 3,359,503 | 12/1967 | Warner | 330—22 X |
| 3,383,678 | 5/1968 | Palmer | 343—7.7 X |
| 3,405,368 | 10/1968 | Howe | 330—21 |
| 3,428,908 | 2/1969 | Locanthi | 330—22 X |

OTHER REFERENCES

Hardy, Proc. Natl. Elect. Con., vol 11, 1955, pp. 476–480.

RICHARD A. FARLEY, Primary Examiner

U.S. Cl. X.R.

340—3; 73—194; 343—8

PO-1050
(5/69)

UNITED STATES PATENT OFFICE
CERTIFICATE OF CORRECTION

Patent No. 3,525,976　　　　　　　　Dated August 25, 1970

Inventor(s) Martin H. Wilcox and Paul H. Egli

It is certified that error appears in the above-identified patent and that said Letters Patent are hereby corrected as shown below:

Column 1, line 19, change "direction" to --detection--.
Column 6, line 27, change "imepdance" to --impedance--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents